US009936346B2

(12) United States Patent
Koukoumidis et al.

(10) Patent No.: US 9,936,346 B2
(45) Date of Patent: Apr. 3, 2018

(54) GEOFENCES FROM CONTEXT AND CROWD-SOURCING

(71) Applicant: Microsoft Technology Licensing, LLC, Redmond, WA (US)

(72) Inventors: Emmanouil Koukoumidis, Bellevue, WA (US); Norm Bryar, Seattle, WA (US); Christopher Alme, Seattle, WA (US); Namita Parab, Redmond, WA (US); Stephen Lawler, Berlin (DE); Anthony Bice, Seattle, WA (US); Vanya Avramova, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/092,968

(22) Filed: Nov. 28, 2013

(65) Prior Publication Data

US 2015/0148061 A1    May 28, 2015

(51) Int. Cl.
*H04W 4/02* (2009.01)

(52) U.S. Cl.
CPC .......... *H04W 4/021* (2013.01); *H04W 4/022* (2013.01)

(58) Field of Classification Search
CPC ............... H04W 4/021; H04W 4/022
USPC ...................................... 455/456.1
See application file for complete search history.

(56) References Cited

U.S. PATENT DOCUMENTS

| 7,912,630 | B2 | 3/2011 | Alewine et al. |
| 8,019,532 | B2 | 9/2011 | Sheha et al. |
| 8,755,824 | B1 | 6/2014 | Wang et al. |
| 8,798,646 | B1 | 8/2014 | Wang et al. |
| 8,812,024 | B2 | 8/2014 | Obermeyer et al. |
| 9,549,286 | B2 | 1/2017 | Birch et al. |
| 2003/0120522 | A1 | 6/2003 | Uyeki |
| 2005/0159883 | A1 | 7/2005 | Humphries et al. |

(Continued)

FOREIGN PATENT DOCUMENTS

EP    2584516 A1    4/2013

OTHER PUBLICATIONS

"Context Awareness with Inertial Sensors", Published on: Jul. 19, 2012, available at: http://www.sensorplatforms.com/context-awareness-with-inertial-sensors/; 1 page.

(Continued)

*Primary Examiner* — Qun Shen

(57) ABSTRACT

Architecture that enables the capability to more effectively define and resize geofences to provide improved geofence utility based on rich context and crowd-sourced data. The architecture enables the intelligent placement of geofences based on rich context that includes both user context and ambient context such as the (predicted or implicitly/explicitly defined) user's travel path, mode of transport, the type of the entity to be visited by the user and geofenced, and the user incentive for visiting the entity to be geofenced. The ambient context includes non-user specific information such as external conditions that may limit or thwart user mobility such as traffic and weather conditions. The rich context and crowd-sourced data assist in improving the spatiotemporal accuracy of suggested/constructed geofences thereby creating a "shaped" geofence that is sufficiently defined to approximate the shape of the entity being geofenced with some degree of accuracy.

19 Claims, 12 Drawing Sheets

(56) References Cited

U.S. PATENT DOCUMENTS

| | | | |
|---|---|---|---|
| 2008/0162034 A1 | 7/2008 | Breen | |
| 2009/0140886 A1 | 6/2009 | Bender | |
| 2011/0112768 A1 | 5/2011 | Doyle | |
| 2011/0148634 A1 | 6/2011 | Putz | |
| 2011/0178811 A1 | 7/2011 | Sheridan | |
| 2011/0256881 A1 | 10/2011 | Huang et al. | |
| 2012/0116931 A1 | 5/2012 | Meyers | |
| 2012/0185419 A1* | 7/2012 | Kuhn | H04M 1/72569 706/12 |
| 2012/0284769 A1 | 11/2012 | Dixon et al. | |
| 2012/0295639 A1 | 11/2012 | Fitoussi et al. | |
| 2012/0306660 A1 | 12/2012 | Stopel et al. | |
| 2012/0307645 A1 | 12/2012 | Grosman et al. | |
| 2012/0309376 A1* | 12/2012 | Huang | H04M 1/72572 455/418 |
| 2012/0310527 A1 | 12/2012 | Yariv et al. | |
| 2012/0323664 A1 | 12/2012 | Klems | |
| 2013/0006522 A1 | 1/2013 | Vellaikal et al. | |
| 2013/0031047 A1 | 1/2013 | Boazi et al. | |
| 2013/0031169 A1* | 1/2013 | Axelrod | H04L 67/306 709/204 |
| 2013/0084882 A1* | 4/2013 | Khorashadi | H04L 67/22 455/456.1 |
| 2013/0099977 A1* | 4/2013 | Sheshadri et al. | 342/450 |
| 2013/0103307 A1* | 4/2013 | Sartipi | H04W 4/021 701/465 |
| 2013/0106592 A1 | 5/2013 | Morgan et al. | |
| 2013/0268353 A1 | 10/2013 | Zeto et al. | |
| 2013/0324166 A1* | 12/2013 | Mian | H04W 4/021 455/457 |
| 2014/0040282 A1* | 2/2014 | Mann et al. | 707/748 |
| 2014/0066101 A1 | 3/2014 | Lyman et al. | |
| 2014/0100793 A1* | 4/2014 | Fales | G01N 33/0009 702/22 |
| 2014/0156410 A1* | 6/2014 | Wuersch | G06Q 30/0261 705/14.58 |
| 2014/0237386 A1* | 8/2014 | Barrington | H04L 65/403 715/753 |
| 2014/0248910 A1* | 9/2014 | Dave | H04W 4/021 455/456.3 |
| 2014/0266698 A1* | 9/2014 | Hall | H04W 4/021 340/539.13 |
| 2014/0288820 A1 | 9/2014 | Opshaug et al. | |
| 2014/0359777 A1 | 12/2014 | Lam et al. | |
| 2015/0031388 A1* | 1/2015 | Chatterjee | H04W 4/021 455/456.1 |
| 2015/0148060 A1 | 5/2015 | Parab et al. | |
| 2017/0238133 A1 | 8/2017 | Partheesh et al. | |

OTHER PUBLICATIONS

"DQ Technologies Web Based Mapping and GPS Tracking", Retrieved on: Jun. 27, 2013, available at: http://www.dqtech.co/files/F16_Order%20Delivery%20Tracking%20Web%20Map.pdf; 2 pages.

Cai, et al., "Design, Analysis, and Implementation of a Large-scale Real-time Location-based Information Sharing System", In Proceedings of the 6th International Conference on Mobile Systems, Applications, and Services, Jun. 17, 2008, 12 pages.

Parab et al., "Geofence Compositions", U.S. Patent Application co-filed with this application, 32 pages.

"International Search Report & Written Opinion for PCT Patent Application No. PCT/US2014/066488", dated Feb. 9, 2015, 9 Pages.

"Second Written Opinion Issued in PCT Application No. PCT/US2014/066488", dated Oct. 2, 2015, 6 Pages.

U.S. Appl. No. 14/092,967, Office Action dated Jun. 15, 2016, 17 pgs.

"On Track Newsletter vol. 22: Tech Knowledge—Drawing Fences, Drawing Conclusions", May 19, 2012, Available at: http://www.positionlogic.com/on-track-newsletter/ontrack-newsletter-vol22-tech-knowledge-drawingences-drawing-conclusions/, 3 pages.

Banker, Steve, "Next Generation Transportation Management Solutions",Apr. 15, 2013, Available at: http://logisticsviewpoints.com/2013/04/15/next-generation-transportation-management-solutions/, 5 pages.

PCT International Search Report in Application PCT/US2014/0066489, dated Feb. 11, 2015, 9 pages.

PCT Second Written Opinion in Application PCT/US2014/0066489, dated Oct. 16, 2015, 6 pages.

Teemu, "Navigil Introduces New-Generation Geofencing Based on Multiple Sensors and Embedded Intelligence", Oct. 29, 2012, Available at:http://www.navigil.com/2012/10/navigil-introduces-new-generation-Jeofencing-based--0n-multiple-sensors-and-embedded-intelligence/, 2 pages.

U.S. Appl. No. 14/092,967 Amendment filed Jan. 21, 2016, 14 pages.

U.S. Appl. No. 14/092,967 OA dated Jul. 22, 2015, 19 pages.

U.S. Appl. No. 14/092,967, Office Action dated May 30, 2017, 15 pgs.

U.S. Appl. No. 14/092,967, Office Action dated Sep. 12, 2016, 12 pgs.

U.S. Appl. No. 14/092,967 Amendment and Response filed Jul. 31, 2017, 9 pages.

U.S. Appl. No. 14/092,967, Office Action dated Oct. 4, 2017, 18 pgs.

* cited by examiner

GEOFENCES FROM CONTEXT AND CROWD-SOURCING

This application is related to co-pending U.S. Patent Application Ser. No. 14/092,967, entitled "GEOFENCE COMPOSITIONS", and filed on Nov. 28, 2013.

BACKGROUND

A geofence is a software-defined virtual perimeter for a physical world area that when intersected by a device as detected using a location-based service causes an event to occur such as a notification to be sent. Accordingly, geofencing is becoming increasingly popular for delivering reminders and other location-based notifications to users. For example, a user can explicitly ask their mobile device to issue a reminder to "pick up milk from <name of a grocery store> on the way home". In this case, a geofence is created around the grocery store and the system triggers communication of the reminder to the user when the user intersects the geofence virtual perimeter.

However, existing solutions provide naive schemes for constructing geofences around entities where the schemes are entity-oblivious and one-size-fits-all applications fail to make geofencing-based solutions effective. While context-oblivious geofences can be very noisy, thereby giving rise to many false negatives and positive triggers, the added capability to manually edit the geofences is tedious and impractical. For example, in speech-based scenarios, the user may enter reminders by voice commands while driving. In such cases, it is impossible for the user to visualize the geofence on a map in order to tell if it is properly placed and sized, let alone to manually edit the geofence.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture utilizes rich context and crowd-sourced data to automatically generate geofences that are intelligently sized, resized, shaped, and placed, and exhibit spatiotemporal accuracy for an improved user experience by significantly reducing the rate of false-negative and false-positive geofence triggers.

The rich context includes both user context and ambient context. The user context comprises, but is not limited to, the (predicted or implicitly/explicitly defined) user's travel path, the mode of transport of the user, the type of the entity to be visited by the user and geofenced, the user incentive for visiting the entity to be geofenced, the probability of the user entering into proximity of the entity to be geofenced, and the time-criticality of performing a task at the entity to be geofenced.

The ambient context includes non-user specific information such as external conditions that may influence (e.g., limit or thwart) user mobility such as traffic and weather conditions, the spatial uniqueness of the geofenced entity, and the next-closest entity scheme for inflating/deflating outer geofences (caching regions for geofence results).

Additionally, the architecture enables the intelligent placement of geofences based on rich user context that includes the user's travel path, the automatic generation of geofences based on analysis of the context of the user data/communication and inferring the user intent/need for geofencing an entity, and the creation of richer geofences that are not just flat boundaries, but gradients. The value of the gradient determines the score/importance for the potential firing (triggering) of the event(s) associated with the geofence.

Another aspect of the disclosed architecture utilizes crowd-sourced data to improve the spatiotemporal accuracy of suggested/constructed geofences thereby creating a "shaped" geofence that is sufficiently defined to approximate the shape of the entity being geofenced with some degree of accuracy. In support of at least defining the shaped geofence, the crowd-sourced entity-identifiable geo-tagged (and optionally, time-tagged, as well) data is obtained, as well as deriving the temporal activation pattern of an entity's geofences obtained from this data, and the creation of mode-of-transport-based entity geofences using the crowd-sourced geofence activation data.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
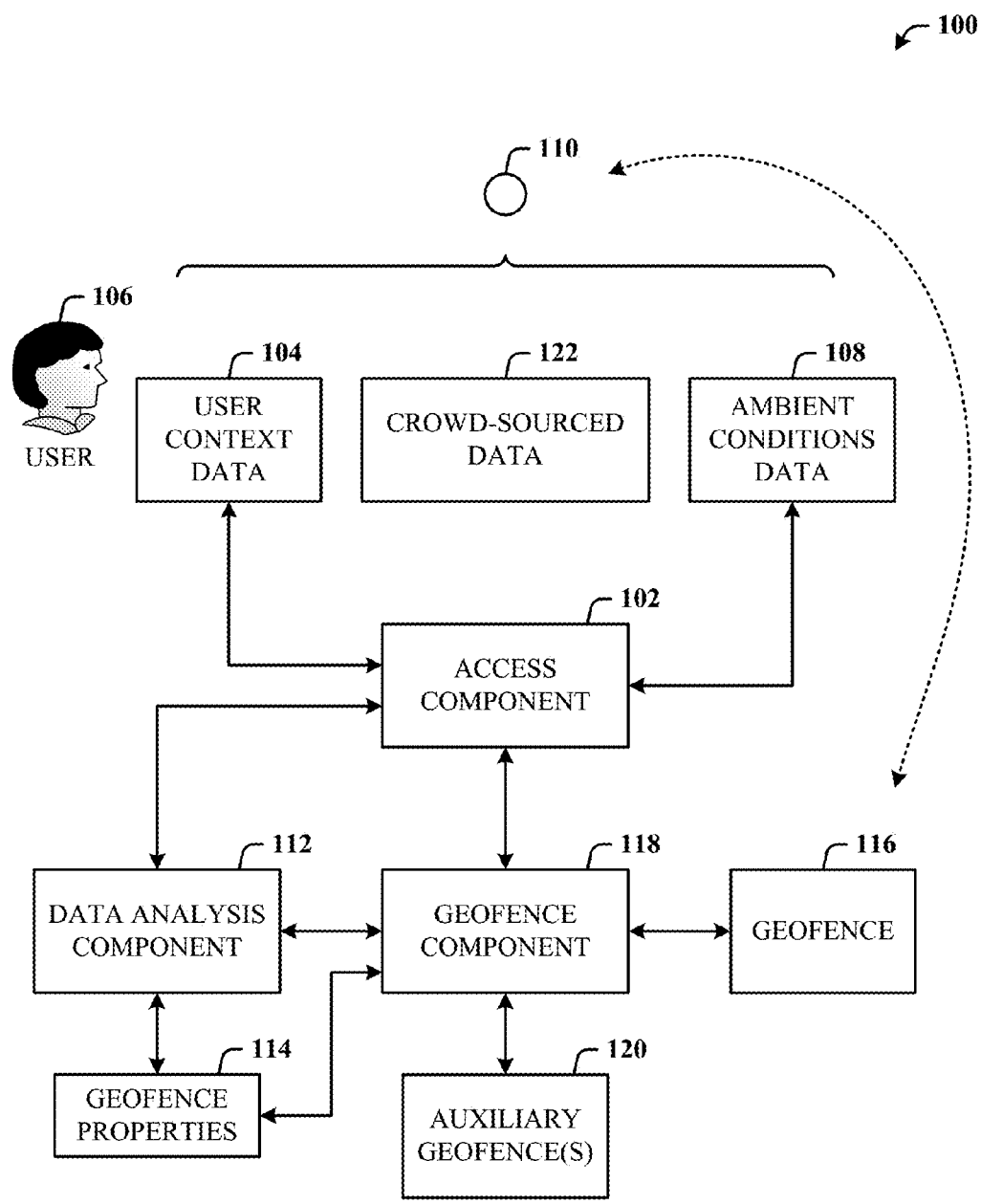
FIG. 1 illustrates a system in accordance with the disclosed architecture.

Existing geofence solutions are based on a naive one-size-fits-all approach for constructing geofences around entities (e.g., business, points of interest, etc.). However, in order to make geofencing-based solutions effective, it is desirable to provide custom geofences per entity that are appropriately sized and shaped. While making the geofence too small will lead to false negative triggers (e.g., the user not being reminded to pick up milk, missing a chance to monetize by offering a relevant deal for a nearby store or the user's membership card not popping up when standing in front of the cashier, etc.), excessively large geofences lead to false positives where the user receives irrelevant notifications for businesses that are further away potentially frustrating the user and reducing success in providing the service.

The disclosed architecture enables the capability to more effectively define, size, shape, and resize geofences to provide improved geofence utility based on rich context and crowd-sourced data. The context includes both user context and ambient context. The user context includes, but is not limited to, the (predicted or implicitly/explicitly defined) user's travel path, the mode of transport of the user, the type of the entity to be visited by the user and geofenced, the user incentive for visiting the entity to be geofenced, the probability of the user entering into proximity of the entity to be geofenced, and the time-criticality of performing a task at the entity to be geofenced.

The ambient context includes non-user specific information such as external conditions that may limit or thwart user mobility such as traffic and weather conditions, the spatial uniqueness of the geofenced entity, and the next-closest entity scheme for inflating/deflating outer geofences (caching regions for geofence results).

Additionally, the architecture enables the intelligent placement of geofences based on rich user context that includes the user's travel path, the automatic generation of geofences based on analysis of the context of the user data/communication and inferring the user intent/need for geofencing an entity, and the creation of richer geofences that are not just flat boundaries, but gradients. The value of the gradient determines the score/importance for the potential firing (triggering) of the event(s) associated with the geofence.

Another aspect of the disclosed architecture utilizes crowd-sourced data to improve the spatiotemporal accuracy of suggested/constructed geofences thereby creating a "shaped" geofence that is sufficiently defined to approximate the shape of the entity being geofenced with some degree of accuracy. In support of at least defining the shaped geofence, the crowd-sourced entity-identifiable geo-tagged data is obtained, as well as deriving the temporal activation pattern of an entity's geofences obtained from this data, and the creation of mode-of-transport-based entity geofences using the crowd-sourced geofence activation data. The crowd-sourced data may be data mined with other more authoritative sources of data such as manually curated sources (user judgment-based sources), government agencies, etc.

Although the description herein focuses on two dimensional (2D) geofences (e.g., circular, polygonal), the disclosed architecture can be extended to shaped polygons, as well as extended to three-dimensional (3D) geofences of any shape. For example, where suitably implemented in hardware and software, a geofence can be of a hemispherical shape such as applied in a multi-level multi-retailer shopping complex that can "cover" multiple floors and check-in locations to identify the location of the user (second floor clothing store versus third floor sporting goods store versus first floor grocery store, etc.), mode of transport (e.g., driving to park, walking in the complex, on a handicap scooter, etc.), compute the user heading (3D vector of x, y, and z values), route of travel throughout the complex, and so on.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an access component 102 that accesses user context data 104 of a user 106 and ambient conditions data 108 as relate to a geographical location 110. The access component 102 can include one or more systems that identify the user's geographical position such as GPS (global positioning system) and/or other geolocation technologies such as triangulation systems (e.g., signal strength, etc.).

These other technologies can include camera systems (e.g., street) that capture images of the user at certain locations such as street corners, retail stores, etc., as well as personal user device sensors (e.g., cameras, accelerometers, audio data, gyroscopes, etc.) that can compute (e.g., estimate) the location of the user and transmit the location information to the access component 102. These technologies can also include check-in systems such as cash registers that receive user identification information indicating the user is at that location, and login systems that identify the user at a specific login location. Still further, these technologies can include communication analysis systems that analyze user data and communications such as text messaging and audio signals to readily identify keywords that indicate the user may be at a specific location and can be inferred to indicate user intent and need.

These technologies further comprise communications systems that facilitate wireless (e.g., Wi-Fi) and wired communications in stores or other facilities and geographical locations (e.g., outdoor areas) that can be used to identify a network address of the user device and/or router addresses (e.g., access points, etc.) that can then be related to a geographical location. Additionally, the user location can be cross-checked using other information such as user schedule information associated with calendar software that indicates the user is scheduled to be at a specific location at a certain time and duration of time, social network information such as messages and social network scheduling programs, and so on.

A data analysis component 112 analyzes at least one of the user context data 104 or the ambient conditions data 108 to generate geofence properties 114 that relate in part to size, placement, resizing, and shape of a geofence 116. As described herein, the geofence properties 114 can relate to resizing a geofence at least in terms of deflation and inflation of the geofence (perimeter).

A geofence component 118 automatically generates the geofence 116 for the geographical location 110 based on the geofence properties 114, and manages changes to the geofence 116 based on changes to the geofence properties 114. The geofence component 118 can be a database system that associates geographical coordinates of the location 110 with a radius such that a circular perimeter is defined, as well as the changing coordinates of the user approaching the geofence such that the geofence triggers an event when the user coordinate intersect the geofence.

The data analysis component 112 can include one or more algorithms that interact with the access component 102 to intelligently derive placement properties (as part of the geofence properties 114) for processing by the geofence component 118 and creation of one or more auxiliary geofences 120 based on the user context data 104 and/or ambient conditions data 108. This geofence placement can be about the location 110 such that the geofence center (or centroid) is centered on the location 110. As similarly indicated, the geofence component 118 can assign a new (auxiliary) geofence to an auxiliary geographical location (a location other than the geographical location 110) such as a street corner, route exit, etc.

Although shown separately, it is to be appreciated that the data analysis component 112 can be part of the geofence component 118 such that, for example, the geofence properties 114 can be derived as part of the capabilities of the geofence component 118. Similarly, the access component 102 can be part of the geofence component 118.

Following are additional aspects that are described herein. The geofence component 118 automatically resizes the geofence 116 to contact a next closest geofence of an entity of similar type as the geographical location 110 based on the changes to the geofence properties 114. The geofence component 118 automatically generates an auxiliary geofence 120 and places the auxiliary geofence 120 for activation prior to activation of the geofence 116 associated with the geographical location 110 based on the changes to the geofence properties 114.

The user context data 104 can include the mode of transport of the user, type of the geographical location 110, incentive to visit the geographical location 110, likelihood the user will be in proximity to the geographical location 110 at a future time, importance of timely performing a task at the geographical location 110, and/or flexibility in a schedule to visit the geographical location 110.

The ambient conditions data 108 is at least one of external conditions that influence (e.g., impede) user mobility (e.g., walk, run, drive, etc.) to the geographical location 110, uniqueness of the geographical location 110, and/or proximity of a next-closest geofence of an entity of similar type as the geographical location 110.

The geofence component 118 can determine an approximated shape of the geographical location 110 based on crowd-sourced geographically-tagged data 122 as part of the geofence properties 114, and shapes the geofence 116 according to the approximated shape of the geographical location 110. The crowd-sourced data 122 can be accessed by the access component 102 and factored in as part of the geofence properties 114. The data analysis component 112 extracts crowd-sourced time-tagged data 122 related to the geographical location 110 to derive a time-based activation pattern for the geofence 116 to determine when to trigger the geofence 116.

The geofence 116 is sized based on a specific mode of transport being used by the user 106, and the geofence component 118 sizes the geofence based on an initial mode of transport of the user 106, and resizes of the geofence 116 based on changes in the modes of transport of the user 106.

As described herein, the geofence need not be restricted to be circle/radius defined, but can be a polygon (or aggregation of polygons) of computed dimensions. Moreover, the circular geofence is not fixed, in that it can be deflated or inflated automatically based on certain criteria. Still further, the geofence can be defined according to gradient values assigned from center (e.g., of the circle or centroid(s) of a polygon or regions of a polygon) outward to the circle (or polygon) perimeter. This applies similarly to 3D (or higher dimension) geofences as well for deflation, inflation, and gradients. Thus, the intersection of the desired data (e.g., user location data) with values defined along the perimeter data of the geofence enables triggering of one or more events, such as notifications, deals, coupons, alerts, reminders, etc.

Although not shown, the system 100 can further comprise a privacy component for authorized and secure handling of user information. The privacy component enables the user to opt-in and opt-out of tracking information as well as personal information that may be available. The user 106 can be provided with notice of the collection of personal information, for example, and the opportunity to provide or deny consent to do so.

Figure 2:
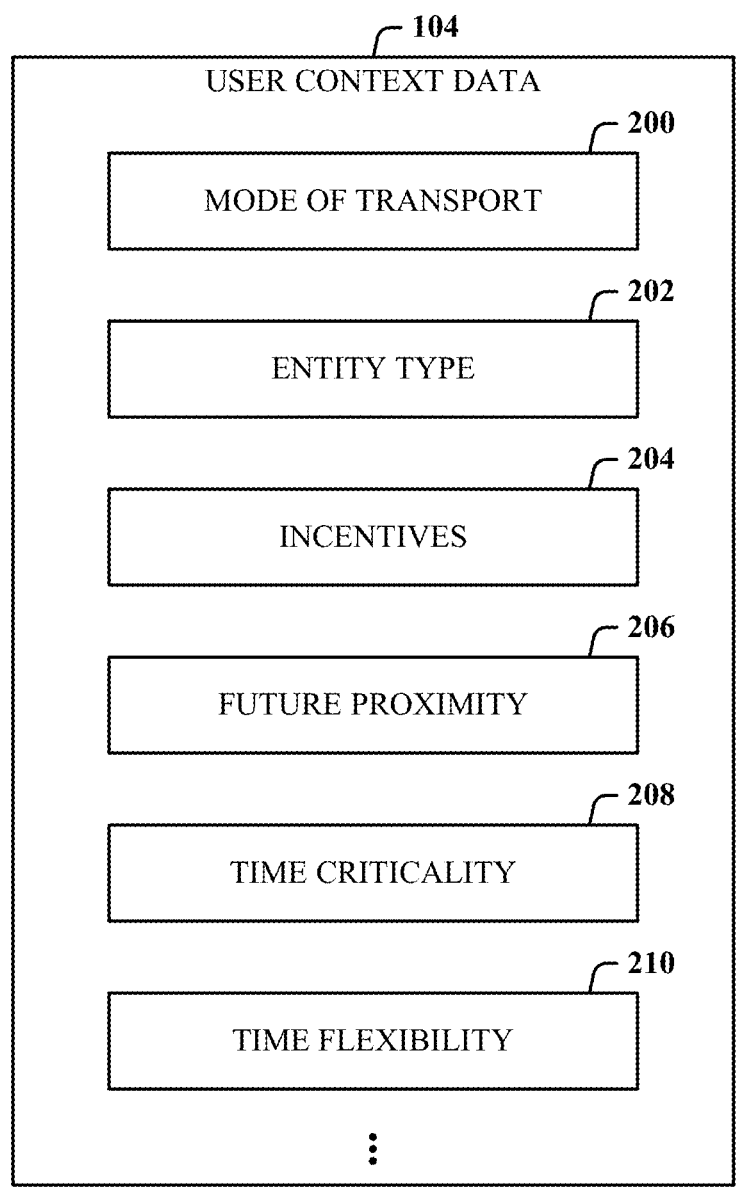
FIG. 2 illustrates the user context data as part of the rich context that can be employed for sizing geofences.

FIG. 2 illustrates the user context data 104 as part of the rich context that can be employed for sizing geofences. Contextual geofence sizing includes, but is not limited to, user contextual data such as the mode of transport 200 used or willing to be used by the user, the type of entity 202 to be geofenced, incentives 204 offered by or in association with an entity, probability of future proximity 206, the time criticality 208 of completing a task relative to the entity, and time flexibility 210 in completing a task of the user.

With respect to the mode of transport 200, it is likely that users will be willing to cover greater distances to obtain a desired article of commerce (e.g., good, service) such as a deal or produce from a grocery store, if the user is driving, as opposed to walking or using public transit. For each entity, the disclosed geofencing service can provide geofences for all different modes of transport. Such geofences can be used to detect when users are within walking distance, driving distance, etc., of an entity. At each point in time only the geofences that correspond to the user's current mode of transport are active. For each entity (e.g., for a grocery store), in addition to the mode-specific geofences, the architecture also provides a shaped geofence. The shaped geofence covers, at a minimum, the structural/physical footprint of the entity (e.g., the building perimeter), which enables the detection of when a user is at (e.g., outside, inside, etc.) a specific entity regardless of the mode of transport.

With respect to entity type 202, users will be typically willing to travel a greater distance to an outlet shopping establishment as opposed to a coffee shop. Thus, geofences can be sized based on the type/category of the specific entity. If no custom geofences have been defined for a given category, then the geofences of the parent category can be inherited.

With respect to geofence sizing based on incentives 204, if users have a percent-off coupon for a retailer, for example, the user will typically be willing to travel a greater distance if planning to buy a winter coat (worth typically a few hundred dollars) as opposed to a summer shirt (worth typically a few tens of dollars). The disclosed architecture can size the geofence based not only on the type of business entity that the user is willing to visit (e.g., the retailer), but also based on the type of the article of commerce the user is willing to consume/purchase (e.g., winter coat).

Another technique to entice (incentivize) users to provide more information is by way of games on user portable devices such as smartphones. Game points or rewards can be issued by directing players to locations of which there is limited existing geo-tagged and/or time-tagged data, for example, in order to capture additional information.

With respect to the probability of future proximity 206, if the user rarely, if ever, visits an area, the geofence(s) can be made larger to avoid missing the opportunity of notifying the user of some special or desired article of commerce when the user is relatively close in proximity to the entity. The user may never revisit the same area in the near future and so a missed opportunity can be considered not only a loss for the business, but also for the consumer. However, if the user frequently visits a certain area relative (e.g., around) to an entity, then the geofence can be maintained as a smaller size and the user notified at some other time when the user comes within a closer distance to the entity.

With respect to time criticality 208, the closer the expiration deadline for a user-specified reminder or some other item of interest (e.g., a service, location, article, etc.), the bigger the geofence for the corresponding entity can be expanded (inflated) as the lower the probability becomes that the user will travel in closer proximity of a given entity before the expiration time. This applies to scenarios such as a voiced reminder, for example, of "Remind me to buy a gift for Mom from <retailer name> by 5/12".

The expiration deadline may be explicitly specified, or the deadline may be inferred (e.g., the system may have or access information about the upcoming birthday of the user's mother). For example, the deadlines may be extracted or inferred from the user calendar, or other source of this type of information such as messages. Time criticality may also result in relaxing the location constrains. For example, if the birthday of the user's mother is coming up and the user is next to a retail store that sells products similar to the retailer mentioned in the original voice reminder, then a geofence for this substitute retailer can still be created, but this substitute retailer may have a smaller radius geofence than the geofences for the primary store mentioned.

Time flexibility 210 (as determined from the user calendar or other scheduling sources) of the user can indicate the user may be more willing to detour to complete a task, and thus, the larger the geofence(s) can be made. The time flexibility of the user can be inferred from calendar entries (e.g., a limited or reduced flexibility if the user needs to be attending a professional meeting in ten minutes and he is still five minutes away) and from mined behavioral patterns (e.g., a personal pattern where the user is free from work after 5 PM or a more general (collaborative filtered) pattern where users are more flexible on weekends).

Figure 3:
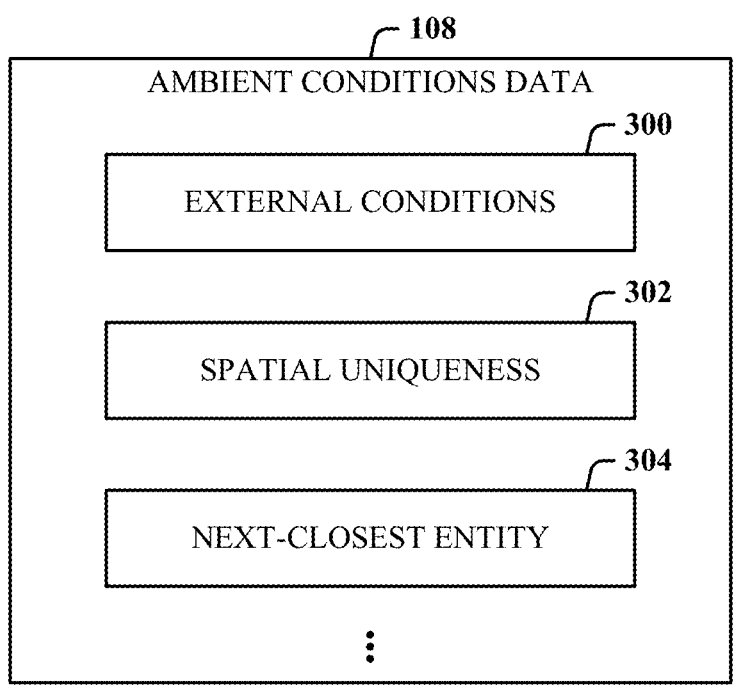
FIG. 3 illustrates the ambient conditions data as part of the rich context that can be employed for sizing geofences.

FIG. 3 illustrates the ambient conditions data 108 as part of the rich context that can be employed for sizing geofences. Contextual geofence sizing can further include, but is not limited to, ambient (external) conditions 300 such as weather, the spatial uniqueness 302 of the entity, and the next-closest entity 304.

With respect external conditions 300, external environmental conditions information (e.g., weather, traffic, construction, events, etc.) can be accessed from many publically-available sources such as websites and cameras. The worse the weather conditions, the less the user may be willing to walk (or even drive) to use a coupon, for example. Similarly, the worse the traffic conditions the less likely the user will be willing to drive to use a coupon or to travel to an entity of interest. Accordingly, the size of the geofences may be automatically (e.g., dynamically) adapted to changes in the external conditions.

With respect to entity spatial uniqueness 302, the rarer or more unique the entity (or article of commerce), the farther the user will likely want to travel (e.g., walk, rider, drive, etc.) to see or obtain the benefits of the entity (e.g., buy produce, use a coupon, etc.). In other words, a geofence for a given entity may be sized based on how many other similar/equivalent entities exist in the vicinity and within the distance to this entity from all the other similar/equivalent entities.

With respect to the next-closest entity 304, since there may exist various limitations in existing geofence implementations (e.g., mobile device), at least with respect to device hardware and/or software limitations, device clients typically request geofences for a limited number of entities. However, there may be more than that limited number of entities in the area. Accordingly, the disclosed architecture can also return an "outer geofence" that defines the area within which the geofences of the closest entities (e.g., grocery stores) are located and within which the user can move without having to issue a new request to get a new list of entities (e.g., grocery stores). When the user moves out of the outer geofence region, the client device needs to query the architecture for a new list of geofenced entities. The architecture (e.g., as a network service) calculates the outer geofence more intelligently based on the location of the next-closest geofence of other similar/equivalent entities. The architecture computes an intelligent outer geofence that inflates/deflates up until it meets the edge of the next closest entity's geofence.

Figure 4:
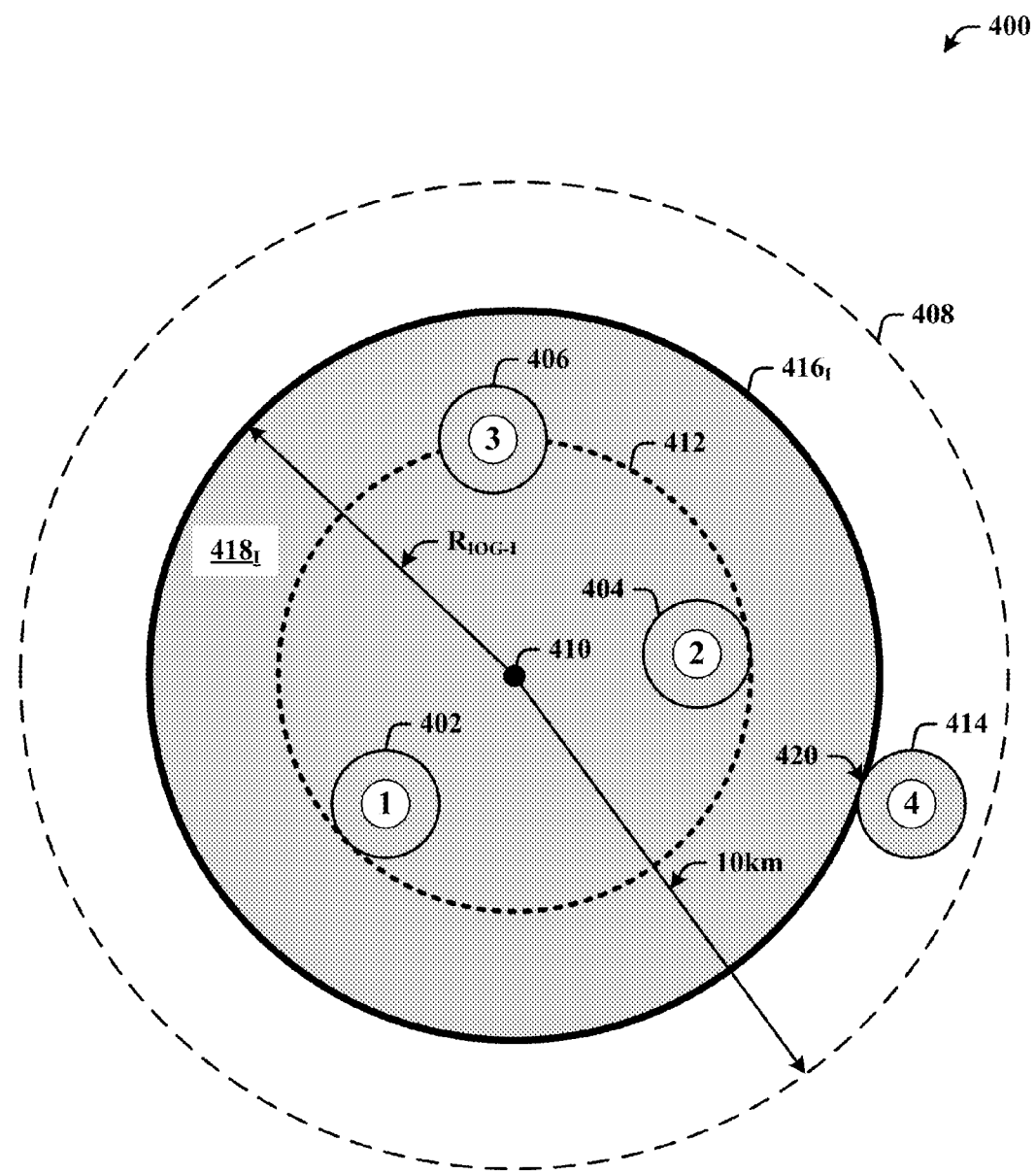
FIG. 4 illustrates a representative diagram for intelligent geofence inflation.
Figure 5:
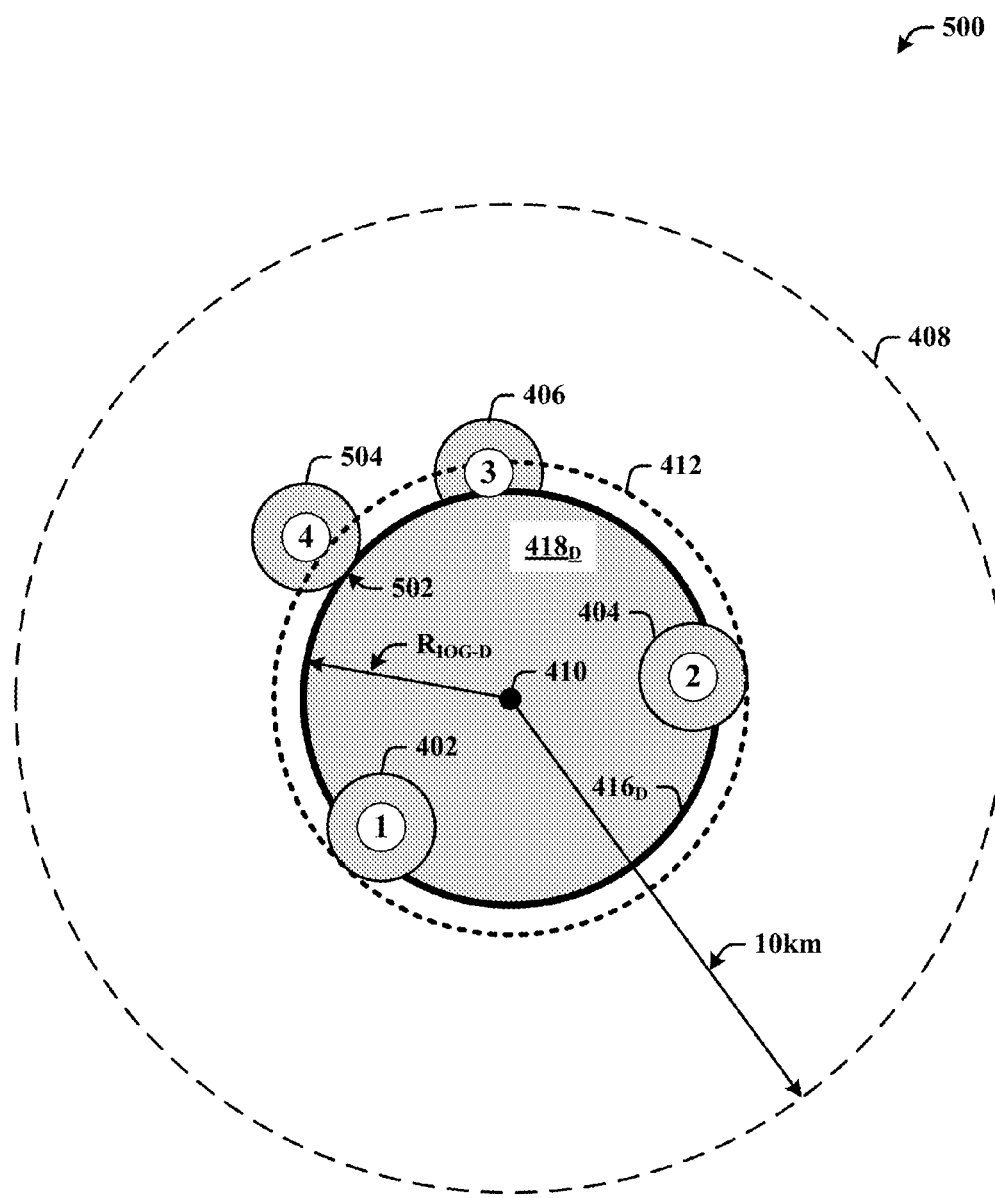
FIG. 5 illustrates a representative diagram for intelligent geofence deflation.

FIG. 4 and FIG. 5 illustrate the capability of intelligent geofence inflation and deflation. FIG. 4 illustrates a representative diagram 400 for intelligent geofence inflation. For example, consider client requests for geofences of up to three store entities (a first store entity 402, a second store entity 404, and a third store entity 406) within an area defined by the perimeter 408 and specified in a request having a ten-kilometer radius of a geographical point of a user 410 (e.g., defined by latitude-longitude), whether walking, driving, riding, etc. Existing geofence creation techniques may define a naive geofence 412 for the three store entities (402, 404, and 406). However, there may be more than three grocery stores within the area defined by the ten-kilometer radius, such as a fourth store entity 414.

For this reason, the disclosed architecture can also automatically compute and return (without being requested by the device client) an intelligent outer geofence $416_I$ (I is inflated) that defines an area $418_I$ of radius, $R_{IOG-I}$ (where R is the radius and IOG-I is the intelligent outer geofence-inflated), within which the geofences of the three store entities (402, 404, and 406) closest to the user 410 are located, and within which the user 410 can move without the user device having to issue a new request to obtain a new list of grocery stores.

When the user 410 moves outside the area $418_I$ of the outer geofence $416_I$, the user's client device needs to query the architecture for a new list of geofenced entities. However, in contrast with the existing naive approach of calculating the outer geofence radius as the distance to the third store entity 406 (entities sorted in increasing distance, and thus, the third store entity 406 is the farthest from the user 410), the disclosed architecture automatically computes (calculates) the outer geofence $416_I$ intelligently based on the location of the next closest geofence of other similar/equivalent entities.

The intelligent outer geofence $416_I$ then automatically inflates (in contrast to the naïve fixed outer geofence approach) until the intelligent outer geofence $416_I$ meets the geofence edge 420 of the next closest entity (fourth store entity 414). This technique provides an optimum efficiency by, for example, deferring the issuing of new requests on energy-constrained devices such as mobile phones, and avoiding false negatives.

FIG. 5 illustrates a representative diagram 500 for intelligent geofence deflation. Consider client requests for geofences of up to the three store entities (the first store entity 402, the second store entity 404, and the third store entity 406) within the area defined by the perimeter 408 having the ten-kilometer radius of the geographical point of the user 410 (e.g., defined by latitude-longitude), whether walking, driving, riding, etc. For intelligent geofence deflation, the intelligent outer geofence $416_D$ (where D=deflates) deflates (as relative to the naïve geofence 412) down to a radius of $R_{IOG-D}$ until the intelligent outer geofence $416_D$ meets a point 502 of a geofence of a fourth store entity 504, which point 502 of the fourth store entity 504 is not included in the results (the client requested only three geofences).

The disclosed architecture can also automatically compute and return (without being requested by the device client) the intelligent outer geofence $416_D$ that defines an area $418_D$ of radius, $R_{IOG-D}$ (where R is the radius and IOG-D is the intelligent outer geofence-deflated), within which the geofences of the three store entities (402, 404, and 406) closest to the user 410 are located, and within which the user 410 can move without having to issue a new request to obtain a new list of grocery stores.

With respect to geofence placement, in existing geofencing approaches, geofences are only placed around the corresponding entity. In contrast, the disclosed architecture utilizes rich user context such as the user's travel path to appropriately place geofence reminders at the locations where the user needs to take specific actions.

Figure 6:
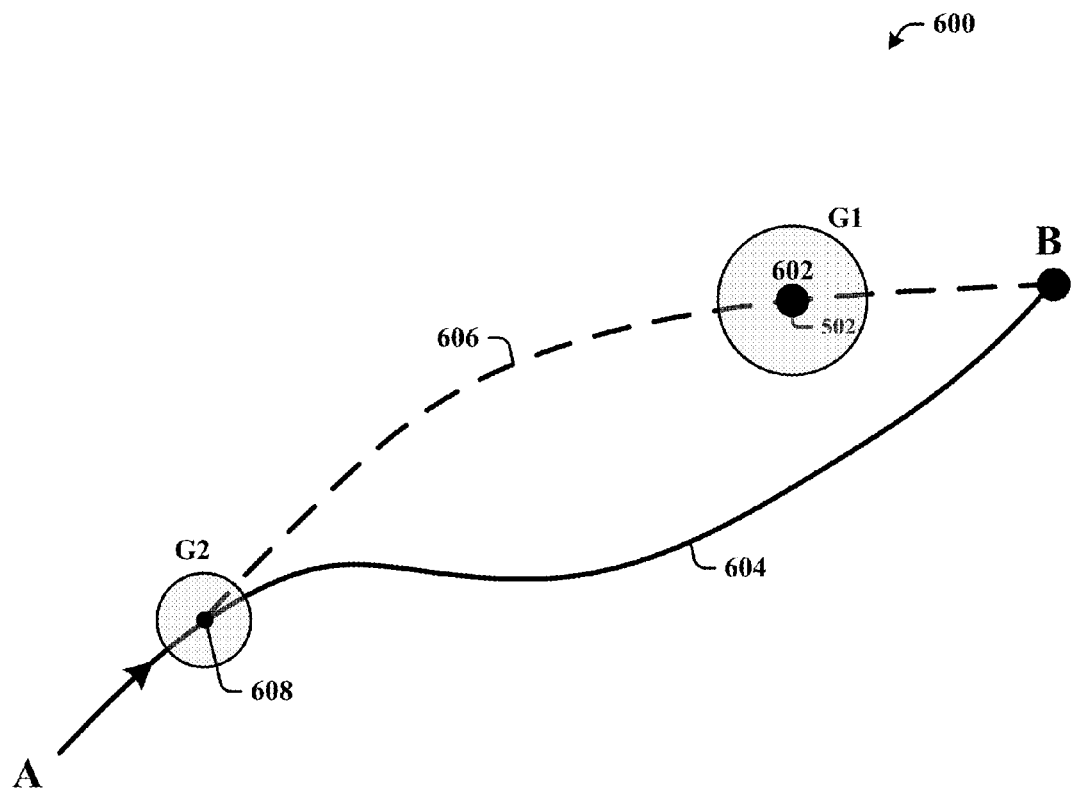
FIG. 6 illustrates a diagram of geofence placement according to the disclosed architecture.

FIG. 6 illustrates a diagram 600 of geofence placement according to the disclosed architecture. Consider a scenario where a user requests the user mobile device to issue a reminder to pick up milk from a specific grocery store at location 602 on the way home that includes a route through a point A to a point B.

Existing geofence schemes only construct a geofence G1 around the grocery store location 602. The geofence G1 will never trigger, unless the user remembers to stop by the grocery store and drives toward the store location 602. Thus, existing geofence implementations defeat the purpose of a reminder, as the problem may not simply be to remember to buy milk once the user is at the grocery store, but more fundamentally, to remember that the user needs to drop by the grocery store in the first place.

The disclosed architecture utilizes the user context to intelligently place one or more auxiliary geofences. More specifically, the architecture is context aware (e.g., route-aware) by comparing the user's regular route 604 (between points A and B) with a new route 606 (between the points A and B) the user can take in order to stop at the store on the way home, and places an auxiliary geofence G2 at the corresponding highway exit 608 ("exit 17") to remind the user to "stay in the right lane and take exit 17 in order to drop by the grocery store".

In another example, a geofence reminder can be placed just before a bus stop to remind the user to get off at the next stop (as opposed to the previously established regular stop) in order to drop by the desired business.

In other words, geofence reminders can be generated not only based on explicit user input (e.g., via a user interface, speech commands, etc.) but also by analyzing the context of the user communication (e.g., voice call, email, etc.), as well as other generated user data (e.g., calendar entries). For example, if the user's communication with a spouse contains a message such as, "Hey, can you please bring some pizza on your way home?"), then a geofence (for the reminder) may be automatically created with or without first prompting the user.

Consider the case where the user is traveling on a route (freeway), yet is unfamiliar with the geographical area and wants to find a specific entity (named Grocery Store) or entity type (any grocery store). While traveling on the route, the user can query for the entity and/or entity type. In response, geofences can be automatically generated for exits ("exit geofences") to the Grocery Store or exits to grocery stores, in general. Thus, with respect to route-aware geofences, this facilitates improved placement of exit geofence(s) on nearby and potential trajectories (routes).

The disclosed architecture also utilizes crowd-sourcing to mine significantly richer entity information with the goal of improving the spatiotemporal (space and time) accuracy of suggested/constructed geofences. Geofence-based reminders and other geofence-based actions include, but are not limited to, offering deals/coupons and automatically surfacing on the user device relevant content (e.g., popping up the user's store credit card while at the store), for example, as opposed to simply pinpointing a location.

More specifically, the disclosed architecture utilizes crowd-sourced data to improve the spatiotemporal accuracy of suggested/constructed geofences thereby creating a "shaped" geofence that is sufficiently defined to approximate the shape of the entity (e.g., structure, building, geographical area of a point of interest, etc.) being geofenced with some degree of accuracy. In support of at least defining the shaped geofence, the crowd-sourced entity-identifiable geo-tagged (and optionally, time-tagged as well) data is obtained, the temporal activation pattern of an entity's geofences is derived from this data, and the mode-of-transport-based entity geofences are created using the crowd-sourced geofence activation data.

The following description of the crowd-source aspect focuses on check-in data; however, it is to be appreciated that the architecture scope covers any type of geo-tagged user data that combines location information with entity information that assist in identifying the entity included in this data. For example, alternative to or in combination with the check-in data, the entity information can include, but is not limited to, electronic wallet transactions that include information for both the store and the location of the user, geo-tagged social network comments, geo-tagged content such as photos, audio, videos, etc. By clustering geo-tagged images, for example, the captions of which include entity-identifiable information (e.g., store name, address, place, etc.), the shaped geofence (geographic boundary) of the entity can be computed.

The disclosed architecture applies data mining techniques such as clustering to de-noise the user check-in data (ensure the data is for that entity) that are associated with a given entity and shape matching to extract the approximated (and where possible, the more precise shape) of an entity. Shape matching is particularly useful for structures such as buildings that typically have standard shapes—most buildings are rectangular in shape as opposed to octagons or circles, for example.

Figure 7:
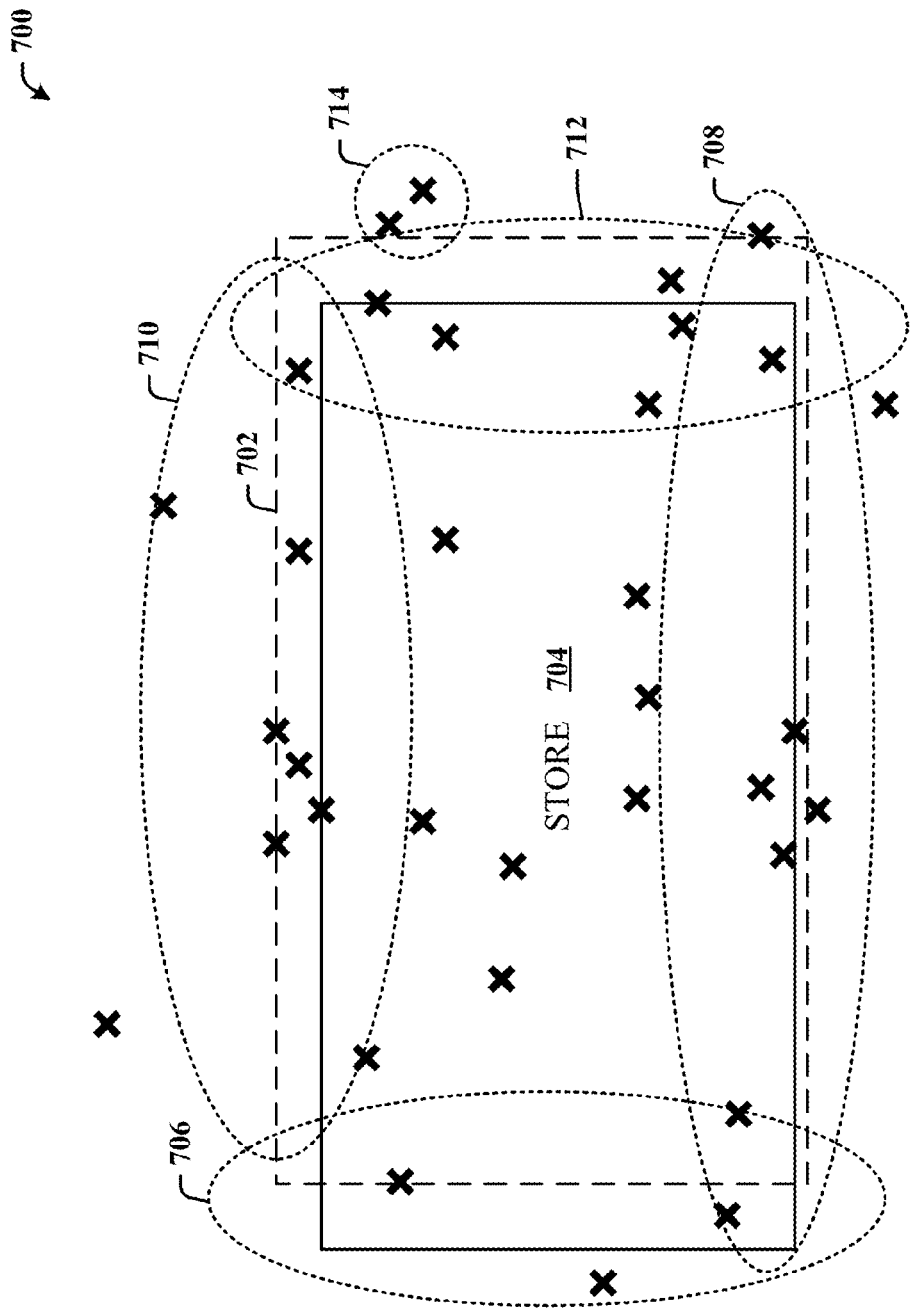
FIG. 7 illustrates a diagram of an exemplary shape matching technique for computing the approximated rectangular shape of geofence for a store using geo-tagged photographs.

FIG. 7 illustrates a diagram 700 of an exemplary shape matching technique for computing the approximated rectangular shape of geofence 702 for a store 704 using geo-tagged photographs as crowd-sourced context data. The disclosed architecture derives the approximated geofence 702 by computing the approximated boundaries of the actual store 704, as estimated from the geo-tagged photographs.

The boundaries are computed by mining data sources and/or devices for geo-tagged photos taken relative to (e.g., inside, outside, etc.) the actual store 704. The "X's" represent locations at which geo-tagged photographs were obtained such as by shoppers (crowd-sourced), and optionally, store camera systems, for example. The locations of the X's are processed (e.g., using clustering) to estimate the boundaries of the structure to be approximated (the store 704).

As previously premised, since most structures are rectangular in shape and the store 704 is of this type of structure, the computing analysis for geofence shape approximation will focus on clusters of X's that define the four sides of the rectangle. For example, a set of X's in and/or around an area 706 can be computed to define an approximated boundary of the geofence 702. Similarly, a set of X's in and/or around an area 708 can be computed to define another approximated boundary of the geofence 702. A set of X's in and/or around an area 710 can be computed to define another approximated boundary of the geofence 702. Finally, a set of X's in and/or around an area 712 can be computed to define another approximated boundary of the geofence 702. A set of X's in and/or around a location 714 can be processed to identify a check-in data location. Thus, this can be an entry and an exit to the store 704. Moreover, since more geo-tagged locations are to one side of the boundaries, it can be inferred that these locations are internal to the store 704 and, hence, the geofence 702.

Alternatively, or in combination therewith, the users can be directed to provide explicit feedback as to the boundaries. For example, to identify corners of the store 704, messages can be sent to users currently located in the store 704 to "please walk to a corner, and receive a coupon" or some other reward. In another example, users can be messaged to walk to specific corners such as the Northeast corner, Southwest corner, and to other features of the store 704 such as a cash register or main entrance. Still further, the user can be requested to manually alter the geofence (as displayed via a geofence application) provided to a more accurate representation of the store 704.

Clustering algorithms that can be employed include, but are not limited to, DBSCAN (density-based spatial clustering of applications with noise) (a density-based clustering algorithm), OPTICS (ordering points to identify the clustering structure) (find density-based clusters in spatial data), and kernel functions, for example.

Figure 8:
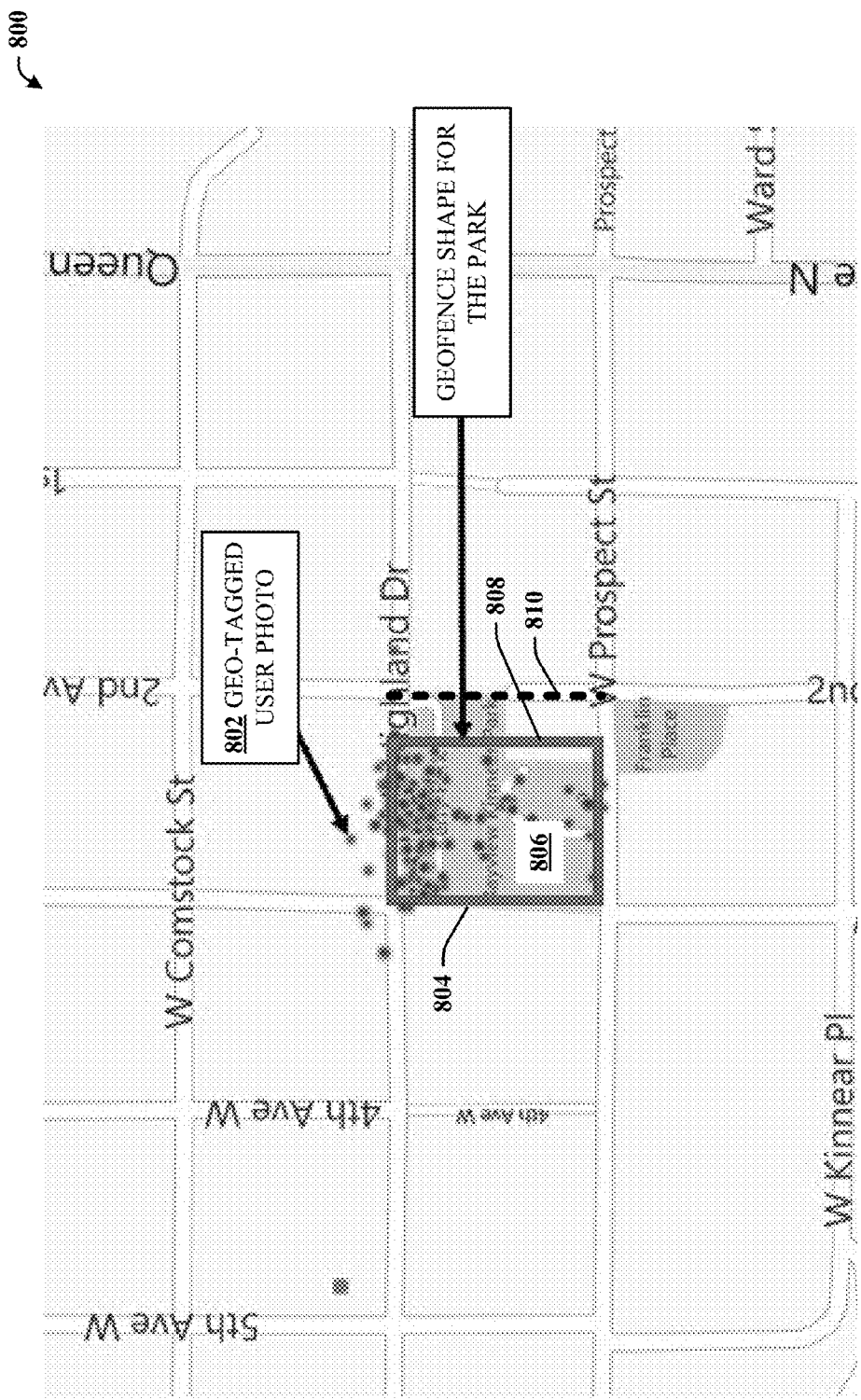
FIG. 8 illustrates a diagram for another example where crowd-sourced geo-tagged photographs are mined to approximate the shape of a geofence for a park.

FIG. 8 illustrates a diagram 800 for another example where crowd-sourced geo-tagged photographs 802 are mined to approximate the shape of a geofence 804 for a park 806. The architecture also obtains geo-tagged photos having metadata that may include not only parsed terms of the park name, but common misspellings.

As before, clustering may be applied to shape the geofence 804 by defining the geofence boundaries. In the example, it can be assumed that based on the street and avenue layout for that area of the city, the park 806 may largely approximate a rectangular area. Accordingly, as an initial premise, the geofence boundaries can be bounded by the street, drives, and avenues. The additional information also includes nearby structures such as buildings, for example. Additional processing then more accurately approximates the geofence boundaries based on the geo-tagged user photos. For example, a right boundary 808 is moved leftward since few if any of the geo-tagged photographs 802 exist as data points relative to the original position 810 of the right boundary 808 defined along "$2^{nd}$ avenue".

Figure 9:
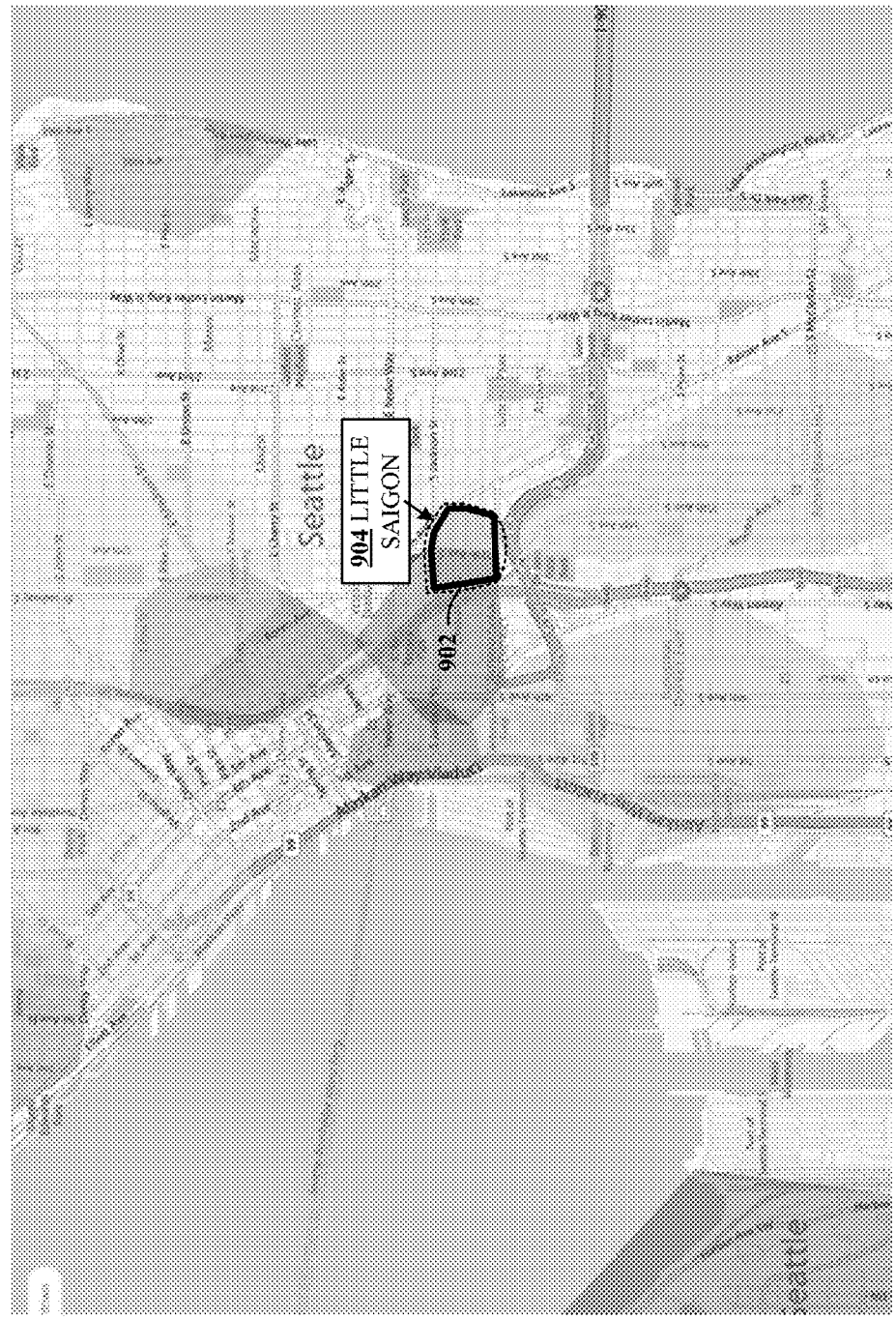
FIG. 9 illustrates a diagram for another example where crowd-sourced geo-tagged photographs are mined to approximate the shape of a geofence for an abstract polygonal entity.

FIG. 9 illustrates a diagram 900 for another example where crowd-sourced geo-tagged photographs are mined to approximate the shape of a geofence 902 for an abstract polygonal entity ("Little Saigon") 904. The architecture also obtains geo-tagged photos having metadata that may include not only parsed terms of an entity such as an ethnic community ("Little Saigon"), but common misspellings.

As before, clustering may be applied to shape the geofence 902 by defining the geofence boundaries. In the example, it can be assumed that based on the street and avenue layout for that area of the city, the entity 904 may approximate a polygon that is not a rectangular area. Accordingly, as an initial premise, the geofence boundaries can be bounded by the street, drives, and avenues that may be in part parallel, perpendicular, and diagonal. Additional processing then more accurately approximates the geofence boundaries based on the geo-tagged user photos. Thus, the disclosed architecture can also be applied to mine geo-tagged data points to define boundaries of a geofence for more abstract entities.

The disclosed architecture also considers temporal activation pattern of an entity's geofence(s) by mining time-tagged data after associating this data with a given entity to extract the temporal activation pattern for the entity's geofences. For example, by mining check-in data the hours of operation (e.g., the popular hours of operation) of a store can be extracted, which at the same time indicates when one or more geofences derived for the entity should be triggered. Other data such as the season of the year, holidays, special events, and so on. For example, a geofence for a store should not fire after midnight (beyond normal hours of operation) as opposed to a geofence for a nightclub which may typically be in operation after midnight. These rules can be developed by mining crowd-sourced time-tagged data.

In addition to developing shaped geofences to approximately match the actual shape of the entity structure, geofences can be derived and sized for different modes of transport (e.g., walking, driving, public transit, jogging, etc.). The shape of the geofence for the mode of transport can relate to isochrone-based travel shape. (An isochrone is a line on a map that connects places from which it takes the same time to travel to a destination point.) To that aim, user reactions to past geofence-based reminders can be mined to infer the willingness of users to walk, drive, etc., to visit a desired entity.

These types of mode-of-transport geofences for a particular user are constructed based on mined personal user movement patterns, collaborative filtered patterns, and/or general patterns across the complete user base. When constructing such crowd-sourced geofences the effect of external factors may also be considered, weighed, and evaluated such as weather/traffic conditions, the social state of the user (e.g., alone, with friends, with wife and kids, etc.), the user's travel characteristics (e.g., entertainment travel as opposed to work travel, etc.), the time of the day, the day of the week, holidays, etc.

Geofencing can also be used to deliver deals/coupons and other offers to entice users to visit a business. Additionally, to enable faster task completion, geofencing can be used to trigger a pop-up window of a user membership card (e.g., a credit card) on a user device such a phone or other device when shopping within the corresponding business.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
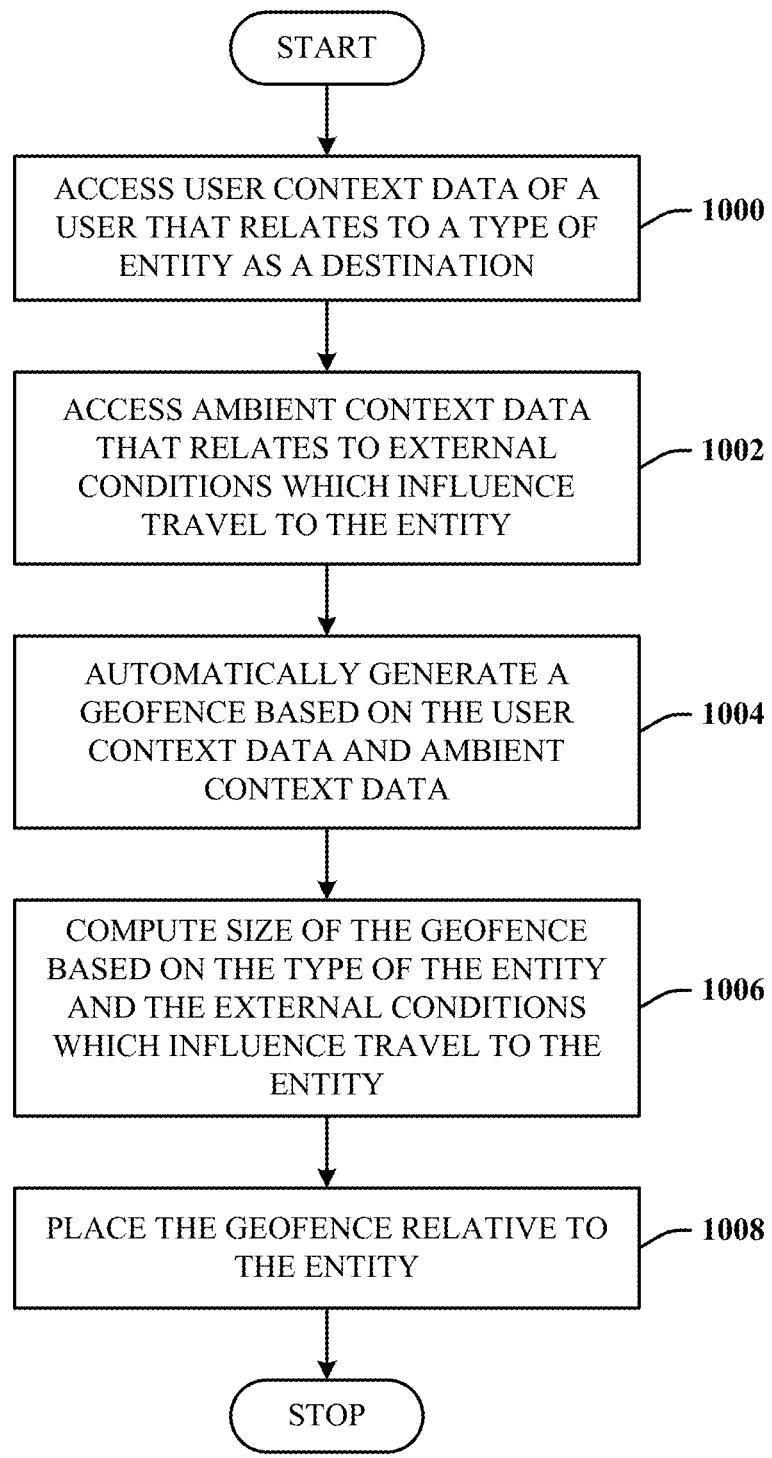
FIG. 10 illustrates a method in accordance with the disclosed architecture.

FIG. 10 illustrates a method in accordance with the disclosed architecture. At 1000, user context data (e.g., mode of transport, entity type, user incentive, time criticality and time flexibility, likelihood of future visit, etc.) of a user is accessed that relates to a type of entity (e.g., a retail store, pharmacy, sporting goods, park, scenic overview, entertainment venue, etc.) as a destination. The user context data can also be based on user biometrics such as health condition of a prolonged time and/or the moment. User context data can also include emergency situations as to urgency in traveling to a specific destination. Moreover, the geofence can be sized and re-sized based on fluid changes in the situation as well as the generation and placement of auxiliary geofences as the situation unfolds and winds down.

At 1002, ambient context data is accessed that relates to external conditions (e.g., weather, road construction, accident, traffic slowdowns and backups, emergency situations, uniqueness of the entity, next-closest entity, etc.), which influence travel to the entity. At 1004, a geofence is automatically generated based on the user context data and ambient context data. At 1006, the size of the geofence is computed based on the type of the entity and the external conditions which influence travel to the entity. At 1008, the geofence is placed relative to the entity such as about the entity.

It is within contemplation of the disclosed architecture that the geofence need not be centered on the entity (e.g., geographical location) but can be offset such as in the direction that the user is approaching the entity (the centroid of the geofence is moved in the direction of the user), and can be dynamically adjusted back (centroids (geometric centers) aligned) to the entity center as the user approaches the entity.

The method can further comprise automatically inflating (increasing a radius of a centroid) or deflating (decreasing a radius of a centroid) the geofence based on changes to at least one of the user context data or the ambient context data. The method can further comprise automatically creating and placing an auxiliary geofence relative to the entity (e.g., on a route of travel to the entity) based on the external conditions which influence travel to the entity.

The method can further comprise automatically re-sizing the geofence according to changes in the user context data that relate to time criticality in completing a task at the entity (e.g., pick up product before closing) or time flexibility in completing the task at the entity (e.g., task completion can be delayed until a later time).

The method can further comprise deriving virtual boundaries of the entity that approximate actual boundaries of the entity and generating the geofence according to the virtual boundaries. For example, if the geofence is a circle, the virtual boundary is its circular perimeter of a defined radius. For a polygon (two or more sides) the virtual boundaries are approximations to the actual polygon sides in length and intersections.

The method can further comprise generating the geofence based on the user context data, which is crowd-sourced geographically-tagged data (e.g., photos) that are identifiable as related to the entity (e.g., a store). As samples are obtained from the users of the crowd (and/or pushed from the user device to the geofence architecture), such as from geolocation data, for example, the actual boundaries of the entity can be approximated by the virtual boundaries.

The method can further comprise computing the size based on analysis of context of user data and user communications and inferring user intent (and/or need) of the geofence for the entity. For example, the user data can be user preferences and/or user historical data accumulated from past user actions and experiences. The user communications can be text messages, emails, audio files analyzed for terms, and so on. User intent can be based on past actions and interactions with the entity (e.g., a specific retail store, returns, purchases, etc.), and in the entity (e.g., a shopping mall, shopping at specific stores of many possible stores).

Figure 11:
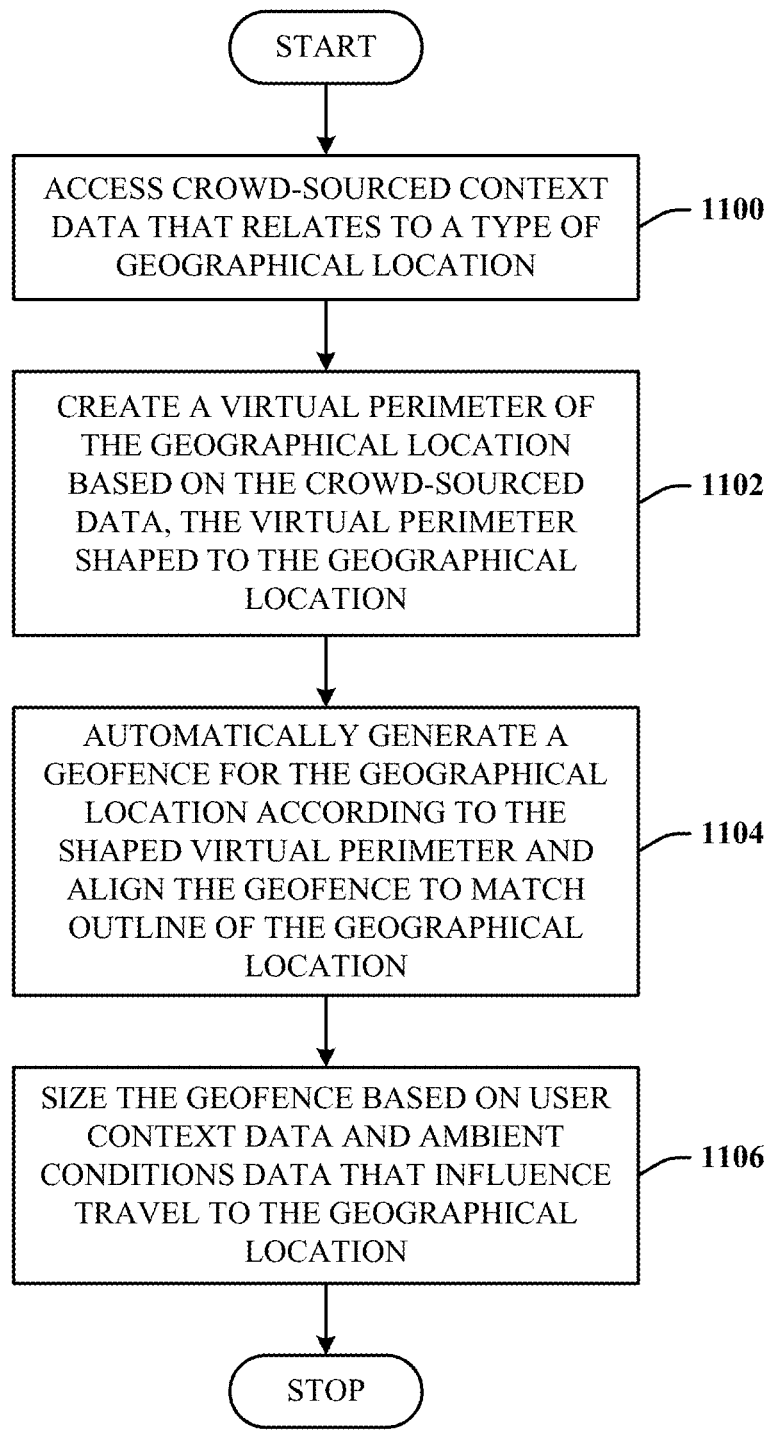
FIG. 11 illustrates an alternative method in accordance with the disclosed architecture.

FIG. 11 illustrates an alternative method in accordance with the disclosed architecture. A computer-readable storage medium comprising computer-executable instructions that when executed by a microprocessor, cause the microprocessor to perform acts of the method. For example, at 1100, crowd-sourced context data are accessed that relates to a type of geographical location.

At 1102, a virtual perimeter of the geographical location is created based on the crowd-sourced data. The virtual perimeter is shaped to the geographical location. Since retail stores are generally rectangular, the virtual perimeter approximates the rectangular shape of the store. If the geographical location is an outdoor park, the shape may not be a standard polygon; however, the virtual perimeter can be approximated using multiple polygons.

At 1104, a geofence is automatically generated for the geographical location according to the shaped virtual perimeter and the geofence is aligned to match the outline of the geographical location. At 1106, the geofence is sized based on user context data and ambient conditions data that influence travel to the geographical location. For example, if the entity is one-of-a-kind store in the whole are, the geofence for that store will be larger so that the likelihood of the user triggering the geofence is high when a product of the store is available and what the user likely wants to buy.

The method can further comprise automatically re-sizing the geofence based on changes in at least one of the user context data or the ambient context data. For example, if the context data related to user mode of transport changes from walking to driving, the geofence can be increased in size, in that, it would be much easier for the user to travel to the geographical location (e.g., a store). Similarly, if ambient context data related to weather conditions change from rainy to sunny, the size of the geofence can be increased since walking to the location is more likely to occur.

The method can further comprise automatically creating and placing an auxiliary geofence on a travel route to the entity based on the external conditions which influence travel to the entity. For example, if the intended route to the location is blocked for some reason (e.g., traffic accident), an auxiliary geofence can be created and placed at an exit or turnoff prior to turning onto the route where the accident occurred to notify the user that the route is temporarily blocked.

The method can further comprise refining shape of the virtual perimeter based on changes in the crowd-sourced data. As more user data is received over time, the accuracy of the virtual perimeter can be improved. The method can further comprise sizing the geofence based on a mode of transport of a user traveling to the geographical location.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
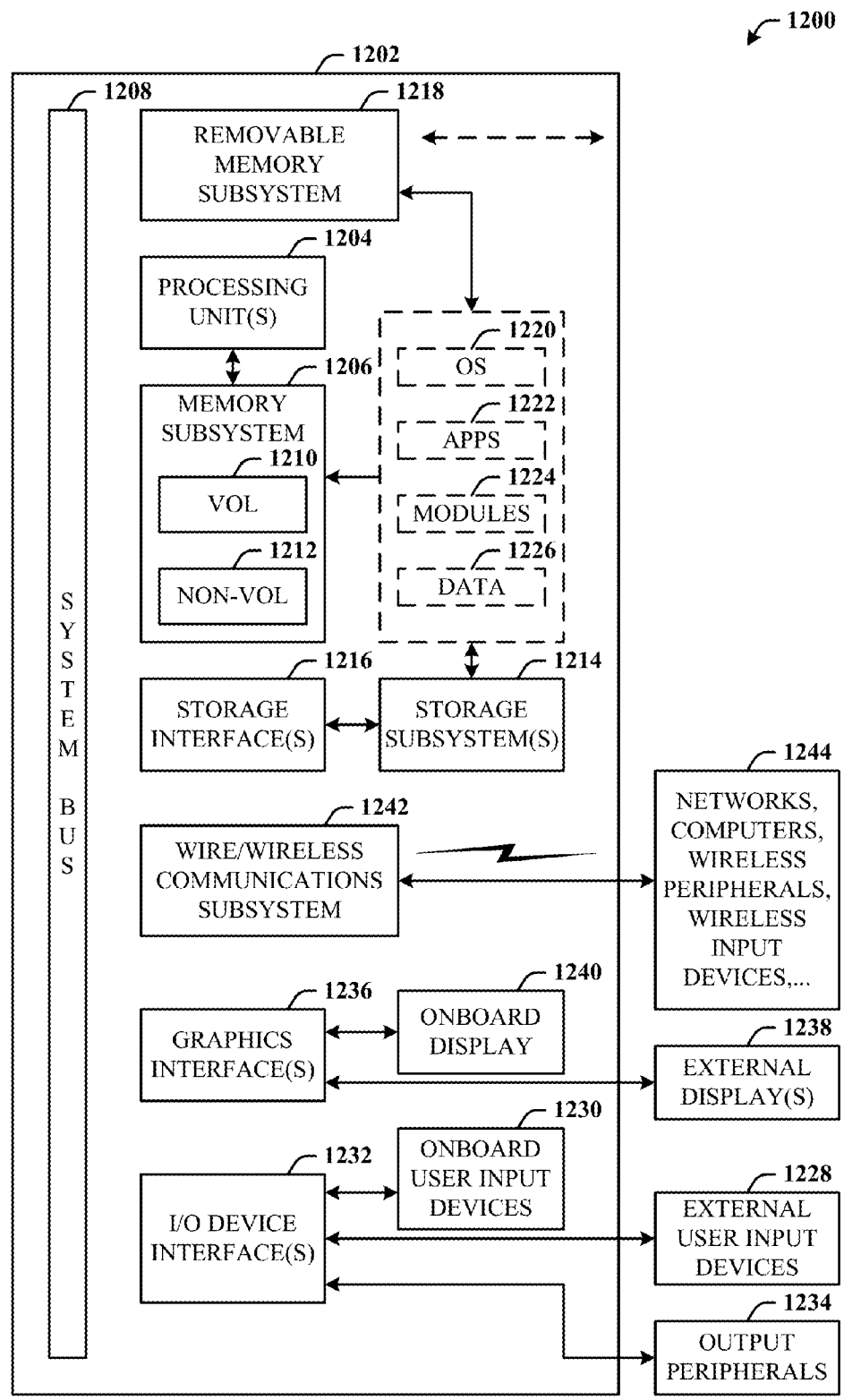
FIG. 12 illustrates a block diagram of a computing system that executes geofences for context and crowd-sourcing in accordance with the disclosed architecture.

Referring now to FIG. 12, there is illustrated a block diagram of a computing system 1200 that executes geofences for context and crowd-sourcing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 12 and the following description are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having microprocessing unit(s) 1204 (also referred to as microprocessor(s) and processor(s)), a computer-readable storage medium such as a system memory 1206 (computer readable storage medium/media also include magnetic disks, optical disks, solid state drives, external memory systems, and flash memory drives), and a system bus 1208. The microprocessing unit(s) 1204 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1202 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1206 can include computer-readable storage (physical storage) medium such as a volatile (VOL) memory 1210 (e.g., random access memory (RAM)) and a non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the system memory 1206 to the microprocessing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes machine readable storage subsystem(s) 1214 and storage interface(s) 1216 for interfacing the storage subsystem(s) 1214 to the system bus 1208 and other desired computer components and circuits. The storage subsystem(s) 1214 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a machine readable and removable memory subsystem 1218 (e.g., flash drive form factor technology), and/or the storage subsystem(s) 1214 (e.g., optical, magnetic, solid state), including an operating system 1220, one or more application programs 1222, other program modules 1224, and program data 1226.

The operating system 1220, one or more application programs 1222, other program modules 1224, and/or program data 1226 can include items and components of the system 100 of FIG. 1, items and components of the user context data of FIG. 2, items and components of the ambient conditions data of FIG. 3, the inflation in diagram 400 of FIG. 4, the deflation in diagram 500 of FIG. 5, the placement aspects of diagram 600 of FIG. 6, the shape matching techniques of diagram 700 of FIG. 7, the crowd-sourcing of diagram 800 of FIG. 8, the crowd-sourcing of diagram 900 of FIG. 9, and the methods represented by the flowcharts of FIGS. 10 and 11, for example.

Generally, programs include routines, methods, data structures, other software components, etc., that perform particular tasks, functions, or implement particular abstract data types. All or portions of the operating system 1220, applications 1222, modules 1224, and/or data 1226 can also be cached in memory such as the volatile memory 1210 and/or non-volatile memory, for example. It is to be appreciated that the disclosed architecture can be implemented with various commercially available operating systems or combinations of operating systems (e.g., as virtual machines).

The storage subsystem(s) 1214 and memory subsystems (1206 and 1218) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1202, and include volatile and non-volatile internal and/or external media that are removable and/or non-removable. For the computer 1202, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1202, programs, and data using external user input devices 1228 such as a keyboard and a mouse, as well as by voice commands facilitated by speech recognition. Other external user input devices 1228 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 1202, programs, and data using onboard user input devices 1230 such a touchpad, microphone, keyboard, etc., where the computer 1202 is a portable computer, for example.

These and other input devices are connected to the microprocessing unit(s) 1204 through input/output (I/O) device interface(s) 1232 via the system bus 1208, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP-based) using logical connections via a wired/wireless communications subsystem 1242 to one or more networks and/or other computers. The other computers can include workstations, servers, routers, personal computers, microprocessor-based entertainment appliances, peer devices or other common network nodes, and typically include many or all of the elements described relative to the computer 1202. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wired/wireless communication subsystem 1242 (e.g., a network interface adapter, onboard transceiver subsystem, etc.) to communicate with wired/wireless networks, wired/wireless printers, wired/wireless input devices 1244, and so on. The computer 1202 can include a modem or other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory for storing executable program code; and
a processor, connected with the memory, the processor being responsive to computer-executable instructions contained in the program code and operative to:
access user context data of a user and ambient conditions data as related to a geographical location;
analyze the accessed user context data;
determine an entity type to generate a geofence for, wherein the analysis of the accessed context data indicates that the entity type is associated with one or more product or service types offered by an entity at the geographical location;
analyze the user context data and the ambient conditions data to generate geofence properties that relate in part to size, placement, and shape of the geofence; and
automatically generate the geofence for the geographical location based on the geofence properties, wherein the geofence is sized to contact a next closest geofence of an entity that offers one or more product or service type that is similar to one or more product or service type offered by the entity at the geographic location.

2. The system of claim 1, wherein the processor is further operative to:
automatically inflate or deflate the geofence based on changes to at least one of the user context data or the ambient context data.

3. The system of claim 1, wherein the processor is further operative to:
automatically generate an auxiliary geofence and places the auxiliary geofence for activation prior to activation of the geofence associated with the geographical location based on the changes to the geofence properties.

4. The system of claim 1, wherein the user context data includes at least one of mode of transport of the user, type of the geographical location, incentive to visit the geographical location, likelihood the user will be in proximity to the geographical location at a future time, importance of timely performing a task at the geographical location, or flexibility in a schedule to visit the geographical location.

5. The system of claim 1, wherein the ambient conditions data is at least one of external conditions configured to impede user mobility to the geographical location, uniqueness of the geographical location, or proximity of a next-closest geofence of an entity of similar type as the geographical location.

6. The system of claim 1, wherein the processor is further operative to:
determine an approximated shape of the geographical location based on crowd-sourced geographically-tagged data as part of the geofence properties, and shapes the geofence according to the approximated shape of the geographical location.

7. The system of claim 1, wherein the processor is further operative to:
extract crowd-sourced time-tagged data related to the geographical location to derive a time-based activation pattern for the geofence to determine when to trigger the geofence.

8. The system of claim 1, wherein the geofence is sized based on a specific mode of transport, and the geofence component is configured to size the geofence based on an initial mode of transport, and is configured to resize of the geofence based on changes in the modes of transport.

9. A method, comprising acts of:
accessing user context data of a user that relates to a type of entity as a destination;
accessing ambient context data that relates to external conditions which influence travel to the entity;
analyzing the accessed user context data;
determining an entity type to generate a geofence for, wherein the analysis of the accessed user context data indicates that the entity type is associated with one or more product or service types offered by an entity at the destination;
automatically generating a geofence based on the user context data and ambient context data;
computing a size of the geofence based on the type of the entity and the external conditions which influence travel to the entity, wherein the geofence is sized to contact a next closest geofence of an entity that offers one or more product or service type that is similar to one or more product or service type offered by the entity at the destination; and
placing the geofence relative to the entity.

10. The method of claim 9, further comprising automatically inflating or deflating the geofence based on changes to at least one of the user context data or the ambient context data.

11. The method of claim 9, further comprising automatically creating and placing an auxiliary geofence relative to the entity based on the external conditions which influence travel to the entity.

12. The method of claim 9, further comprising automatically re-sizing the geofence according to changes in the user context data that relate to time criticality in completing a task at the entity or time flexibility in completing the task at the entity.

13. The method of claim 9, further comprising deriving virtual boundaries of the entity that approximate actual boundaries of the entity and generating the geofence according to the virtual boundaries.

14. The method of claim 9, further comprising generating the geofence based on the user context data, which is crowd-sourced geographically-tagged data that are identifiable as related to the entity.

15. The method of claim 9, further comprising computing the size based on analysis of context of user data and user communications and inferring user intent of the geofence for the entity.

16. A computer-readable hardware storage medium comprising computer-executable instructions that when executed by a microprocessor, cause the microprocessor to perform acts of:
accessing crowd-sourced context data that relates to a type of geographical location; creating a virtual perimeter of the geographical location based on the crowd-sourced data, the virtual perimeter shaped to the geographical location;
automatically generating a geofence for the geographical location according to the shaped virtual perimeter and aligning the geofence to match an outline of the geographical location;
sizing the gaeofence to contact a next closest geofence of an entity that offers one or more product or service type that is similar to one or more product or service type offered by an entity at the geographical location; and
automatically re-sizing the geofence based on changes in at least one of user context data or ambient context data.

17. The computer-readable hardware storage medium of claim 16, further comprising automatically creating and placing an auxiliary geofence on a travel route to the entity based on the external conditions which influence travel to the entity.

18. The computer-readable hardware storage medium of claim 16, further comprising refining shape of the virtual perimeter based on changes in the crowd-sourced data.

19. The computer-readable hardware storage medium of claim 16, further comprising modifying the size of the geofence based on a mode of transport of a user traveling to the geographical location.

* * * * *